United States Patent Office 3,005,812
Patented Oct. 24, 1961

3,005,812
PROCESS FOR REMOVING SOLVENTS FROM CHLORINATED POLYETHYLENE RESINS
Herbert C. Wohlers, Syracuse, N.Y., assignor to Allied Chemical Corporation, a corporation of New York
No Drawing. Filed Feb. 6, 1958, Ser. No. 713,542
10 Claims. (Cl. 260—94.9)

This invention relates to a process for separating normally solid, chlorinated, low molecular weight polyethylene products from solutions thereof in water-immiscible volatile solvents, and more particularly to a process for removing substantially completely therefrom, the chlorine-stable solvent chlorinating medium in which they were prepared, in a manner such that a pulverulent, non-sticky, free flowing, finely divided solid is directly obtained.

It is known to chlorinate low molecular weight, waxy polyethylenes and oxidized low molecular weight polyethylenes, to produce resinous solids containing up to about 72% by weight chlorine content. Such chlorinations may be carried out by dispersing the polyethylene wax in a chlorine-stable liquid such as carbon tetrachloride, and bubbling molecular chlorine through the dispersion at elevated temperatures in the presence of light, for example, as disclosed in U.S. Patent No. 2,779,754 of Michael Erchak, Jr. and U.S. application Serial No. 692,485 of John C. Eck and William C. Kraemer, filed October 25, 1957.

These chlorinated polyethylene materials are characterized by high degrees of solubility at normal room temperatures (20–25° C.), in liquid aromatic hydrocarbons, cycloaliphatic unsaturated hydrocarbons and ketones, and chlorinated derivatives of the above, from which they deposit hard tenacious films on solvent removal, which have a high degree of flame resistance and, in certain cases, water repellency as well. The chlorinated polyethylene materials of this character are, therefore, useful in the preparation of coating compositions for various surfaces, including metal, wood, paper, masonry and the like.

The resinous chlorinated polyethylene products prepared as above described have been separated from the solution thus obtained by precipitation by means of an anti-solvent, for example, an alcohol, such as methanol, followed by filtration and drying.

It has also been suggested to isolate chlorinated polyethylenes, particularly those of high molecular weight or lower chlorine content, from the solvent by passing the solution into water maintained at a temperature near the boiling point of the water, and flash distilling off the lower boiling solvent, e.g. carbon tetrachloride. In this latter process the chlorinated polyethylene collects as a white solid floating on the water, from which it can be strained off.

Chlorinated polyethylene products recovered by either of the above procedures, however, contain relatively high percentages of residual solvent, sometimes as high as 8 to 10%, which render the products unsuited for many purposes. The presence of the solvent lowers the fusion point of the product, renders it malodorous, and constitutes a toxic hazard when the product is used as a coating for food containers and the like. Accordingly, to be commercially acceptable, a chlorinated low molecular weight polyethylene resin product should have a residual solvent content of not more than about 5%, and, for certain uses, not more than about 2%, preferably less.

The flash distillation recovery process above described, while having certain operating advantages over the methanol precipitation process, is especially unsatisfactory and unsuitable for the recovery of the chlorinated low molecular weight polyethylenes resulting from chlorination to between about 50% and about 72% chlorine, of polyethylene waxes initially having average molecular weights between about 1,000 and about 3,000 and oxidized polyethylene waxes having average molecular weights between about 600 and about 3,000. When such chlorinated polyethylene solutions in e.g. carbon tetrachloride, are poured into hot water, in an attempt to remove the carbon tetrachloride by volatilization, the resulting product, as it solidifies, becomes a sticky gummy mass due to the lowered fusion point of the low molecular weight, solvent-contaminated product. This product sticks to the walls of the container and to the agitator mechanism and agglomerates with itself to form an impenetrable, spongy blanket on the top of the container which not only is difficult to handle, but effectively prevents further escape of volatilized solvent. Consequently the chlorinated low molecular weight, high chlorine content polyethylene products so recovered are not only too high in residual solvent to be commercially acceptable, but are subject to high mechanical handling losses.

The influence of carbon tetrachloride content on the fusion point of a chlorinated polyethylene wax containing about 70% chlorine is shown in Table I below:

TABLE I

Influence of carbon tetrachloride content on fusion point of 70% chlorine content polyethylene

| $CCl_4$ content, percent by weight: | Fusion point, ° C. |
|---|---|
| 8.0 | 205 |
| 4.9 | 212 |
| 3.3 | 215 |
| 1.7 | 219 |

It is, therefore, an object of my invention to provide a process for preparing chlorinated reaction products of low molecular weight polyethylene resinous materials of low residual solvent content.

It is a further object of the invention to provide a process for preparing such low solvent content chlorination products of low molecular weight polyethylenes, in which sticking of product to the recovery equipment and resultant mechanical losses are minimized.

These and other objects are accomplished according to my invention wherein a solution of a chlorinated, low molecular weight polyethylene in a chlorine-stable, water immiscible solvent having a boiling point below that of water, is added gradually to a dilute, aqueous solution of a surface active agent, maintained at a temperature above the boiling point of the water-immiscible solvent, and below the agglomeration temperature of the chlorinated polyethylene resin.

In carrying out the process according to my invention, the water-immiscible solvent solution of the chlorinated polyethylene is introduced slowly, preferably in a thin stream, into an aqueous solution of surface active agent while the latter is maintained under agitation and at a temperature above the boiling point of the water-immiscible solvent, and sufficiently below the fusion temperature of the chlorinated polyethylene material, to avoid agglomeration.

As the stream of chlorinated polyethylene solution enters the aqueous surface active agent, it is broken up and emulsified into a dispersion of small liquid droplets in the aqueous liquid. The heat of the aqueous solution causes immediate volatilization of the solvent near the surface of the droplets, and, as agitation is continued, additional solvent, diffusing to the surface of the droplets, volatilizes, migrates to, and escapes from, the surface of the aqueous liquid, and is withdrawn from the area above the solution, according to the well known principles of "flash distillation."

During the addition of the chlorinated polyethylene solution to the aqueous surface active agent solution, the major portion of the solvent is removed, and the dispersed droplets solidify and form a dispersion of nonsticky solid particles in the aqueous surfactant solution. Under the conditions employed in my invention, virtually no coalescence of the solid particles occurs, and no sticking of the product to the sides of the vessel nor to the agitator mechanism, and, most important, no blanketing of the surface of the liquid occurs to prevent escape of the volatilized solvent from liquid medium.

For some purposes, the solvent removal effected simply by gradual mixing of chlorinated polyethylene solution with hot aqueous surface active agent solution, as described above, may be sufficient, and the product may then be recovered by separating the solid particles from the aqueous medium, as by filtration, followed usually by washing the product free of surface active agent and drying.

However, as the product at the above stage may often contain as much as about 5% or more of residual solvent, it may be, and frequently is, desirable to treat the dispersion further to remove additional proportions of solvent. In such cases, after the aqueous and solvent solutions have been mixed, the dispersion may be heated with agitation for further periods in the presence of surface active agent, at or near the boiling point of the water to "steam distill" additional quantities of residual solvent, together with water vapor. This period of heating may vary in time, depending on the degree of solvent removal required. In general, an additional heating period of from about 24 hours to about 48 hours may suffice to reduce the solvent content of the product to from about 2% to about 0.3% which, for most purposes, may be considered "solvent free" from a commercial standpoint.

Agitation during the heating period described above may be carried out by mechanical means as with paddle or other type mechanical agitators, or gas ebullition may be employed in place of or supplemental to the mechanical agitation. Use of gas ebullition agitation at elevated temperature, as by bubbling air or other inert gas through the slurry, aids in sweeping out the solvent vapor as it is released from the finely divided particles of chlorinated polyethylene product, and may result in more nearly complete removal of residual solvent in a shorter time than can be accomplished without its use and at lower temperatures, for example even at temperatures as much as 20° C. below the boiling point of the solvent.

The chlorinated polyethylene materials to which my invention applies are those obtained by chlorination to from about 50% to about 72% chlorine content, of the normally solid, hard, waxy polymers of ethylene which are saturated aliphatic compounds characterized by a recurring —CH$_2$— group, and which have average molecular weights between about 1,000 and about 3,000 by the Staudinger viscosity method (Harris, J. Polymer Science vol. VIII No. 4 pp. 353–364 April 1952), especially the polyethylene/alkanol telomer waxes of this character. These polymers of ethylene may be prepared, for example, by subjecting ethylene, either alone, or in the presence of a co-reactant, to temperatures between about 150° C. and about 300° C., and pressures ranging from about 500 p.s.i. to about 7000 p.s.i. If a co-reactant is used, it may be, for example, a normally liquid organic compound, free of olefinic unsaturation, e.g. consisting of carbon, hydrogen and oxygen, for example, lower ($C_2$ to $C_4$) alkanols, such as ethanol, n-propanol, isopropanol, n-butanol, secondary butanol or isobutanol, a ketone such as acetone, an ether, an alkane, an alkyl benzene, etc. When ethylene is thus polymerized in the presence of a co-reactant, for example, as disclosed in U.S. Patents 2,683,141 and 2,504,400 of Michael Erchak, Jr., a "telomer" is formed, which is essentially polyethylenic, and containing as a terminal addition to its polyethylene chain, a radical of the co-reactant. Such polyethylene waxes, containing an alcohol group in their structures, are referred to as polyethylene/alkanol telomers. A process for chlorinating such waxes is described in U.S. Patent 2,779,754 of Michael Erchak, Jr.

I may also use, in the process of my invention, chlorinated polyethylene materials obtained by chlorinating the oxidation products of the polyethylene waxes described above, which have been oxidized, as described in co-pending application Serial No. 515,770 of Michael Erchak, Jr., by subjecting such waxes, especially the polyethylene/alkanol telomer waxes having average molecular weights between about 1,000 and about 3,000 (Staudinger), in the liquid phase to the action of an oxygen-containing gas to cause the reaction of at least about 5 pounds of oxygen per 100 pounds of wax, preferably between about 10 pounds and about 17 pounds of oxygen per 100 pounds of wax, i.e. to provide an oxidized polyethylene wax containing at least about 3%, preferably about 6% and about 9% of oxygen by weight, based on the weight of the oxidized wax, and acid numbers of not more than about 60, preferably between about 20 and about 50. The oxidized polyethylene/isopropanol telomer waxes prepared according to the above method are especially preferred. A process for chlorinating such waxes is disclosed in the copending application of John C. Eck and William C. Kraemer, above referred to. Chlorinated, oxidized products prepared according to the above process to provide resinous products containing from about 30% to about 72% chlorine by weight are preferably utilized in my invention.

The average molecular weights of the chlorinated polyethylene resins of my invention, including the chlorinated oxidized polyethylene resins, range between about 1,500 and about 10,000. Starting with the polyethylene waxes, such as the polyethylene/alkanol telomer waxes having average molecular weights from about 1,000 to about 3,000, and the oxidized polyethylene/alkanol telomers having average molecular weights from about 600 to about 3,000, chlorination of these waxes to the extents indicated, produces chlorinated products of considerably higher average molecular weights than the starting waxes, for example from about 1,500 to about 10,000 or higher, the higher chlorine content products in general having the higher average molecular weights.

The water-immiscible, chlorine-stable solvent medium in which the chlorinated polyethylene materials of the invention are dissolved, and from which solvent is removed according to the present invention, have boiling points below that of water, i.e., below 100° C. under standard atmospheric conditions, preferably between about 30° C. and about 90° C., although solvents having lower boiling points, i.e. down to about 10° C. may be used if desired, but may present added operating difficulties. Suitable solvents include halogenated aliphatic hydrocarbons in the above boiling point range, for example, carbon tetrachloride, B.P. 76.7° C., chloroform, B.P. 61.2° C., methylene chloride, B.P. 40.1° C., ethylene chloride, B.P. 38.7° C., and trichorofluoromethane, B.P. 24.1° C. Carbon tetrachloride is the preferred solvent because it is the solvent medium customarily used in the chlorination of the polyethylene waxes as defined above, and because of its high chlorine stability, ready availability and its advantageous boiling point, well below the boil-ing point of water but not so low as to volatilize readily at normal asmospheric temperatures.

The solids concentration of the chlorinated polyethylene in the carbon tetrachloride solution is not unduly critical so long as the concentration is not so high as to seriously impair flowability, and not so low as to be uneconomic. In general concentrations between about 10% and about 25% are preferred, and between about 12% and about 16% being optimum in most cases.

The presence of surface active agent in the aqueous medium is essential to the success of the process. In the absence of a surface active agent dissolved in the water, the chlorinated polyethylene particles agglomerate to form large spongy lumps which float on top of the water, impairing escape of solvent, and which attach themselves to the walls of the vessel and to the agitator mechanism. In the presence of surface active agent, finely divided solid particles are formed having maximum diameters of about 2 millimeters, the majority of particles being below this size, and which have virtually no tendency to agglomerate into larger lumps even upon filtration and drying.

Any suitable surface active agent may be used including the nonionic, anionic and cationic types including such nonionic surfactants as the ethylene oxide-alkyl phenol condensation products ("Igepals"), the polyoxyethylated sorbitan mono-oleates ("Tween"), polyoxyethylated vegetable oils ("Emulphor"), polyoxyethylene monolaurate ("Nopalcol") etc.; such anionic surfactants as the ammonium alkyl phenoxypolyoxyethylene ethyl sulfates ("Alipals") long chain alkyl aryl sulfonates ("Nacconols"), sodium higher alkyl sulfate ("Orvus"), sodium alkyl naphthalene sulfonates ("Nekal") etc.; and such cationic surfactants as the dimethyl benzyl higher alkyl ammonium chlorides, higher alkyl dimethyl amine oxides, higher alkyl trimethyl ammonium chloride, higher alkyl polyoxyethylene amines etc. Mixtures of the nonionic and anionic agents, or of the nonionic and cationic agents, may also be used. In general I prefer to use the acid stable surface active agents, since the pH of the slurry may become quite low as chlorinated polyethylene solution is added to the mixture, for example it may drop to a final pH of about 2 to 3. Suitable acid-stable surface active agents include the nonionic and cationic surfactants mentioned above and such anionics as the ammonium alkyl phenoxypolyoxymethylene ethyl sulfates.

Non acid-stable surface active agents may be employed with good reuslts simply by adding an alkaline material to the aqueous solution or by buffering the mixture to the pH at which the particular surface active agent is stable.

Anti-foam agents may be added as required to control foaming where this occurs.

Optimum concentrations of surface active agent in the water may vary somewhat with the particular chlorinated polyethylene material and the surface active agent used, but in general concentrations of at least about 0.01% should be used, preferably between about 0.01% and about 0.5%. Larger quantities do no harm but are unnecessary, and may cause foaming.

Adequate agitation should be employed to maintain the particles dispersed in the liquid and prevent their migration to the top of the water. Any of the ordinary commercial agitators are suitable, and gas ebullition may be used to supplement or replace mechanical agitation, particularly after the chlorinated polyethylene solution and the aqueous surfactant solution have been mixed.

The rate of addition of the solvent solution of chlorinated polyethylene material to the agitated water solution of surface active agent is important, and should be gradual enough to permit substantial "flashing," i.e. volatilization and escape, of the solvent upon contact of the solutions. This rate will depend largely on the difference between the water temperature and the boiling point of the solvent and to some extent on the concentration of the chlorinated polyethylene solution. In general, rates of addition for solutions up to about 15% concentrations, of between about 2 volume parts and about 15 volume parts of solvent solution per hour per 100 volumes of aqueous surface active agent solution are satisfactory at a temperature differential of about 20° C.

The chlorinated polyethylene solution in the solvent must be added to the hot water, rather than vice versa.

The process may be carried out either batchwise or continuously. In continuous operation, the chlorinated polyethylene solution and the aqueous surfactant solution may be added continuously to a reactor maintained at the operating temperature, from which the slurry formed is continuously withdrawn for further processing.

As brought out above, for successful removal of the solvent, the aqueous dispersion medium is maintained at a temperature above the boiling point of the solvent, but sufficiently below the fusion temperature of the product to avoid agglomeration. The fusion temperatures of the chlorinated polyethylene materials vary with varying chlorine contents, the higher chlorine content products having higher fusion temperatures. In general, however, fusion temperatures will range from a minimum of about 90° C. for the 50% chlorinated products, to a maximum of about 220° C. for the 72% chlorinated products, a 60% chlorinated product having a fusion point of about 130° C. Products having fusion temperatures of about 90° C. and above can be successfully processed according to my invention.

For successful solvent removal from the lower fusion point products, e.g. from about 90° C. to about 150° C., it is desirable to carry out the distillation under reduced pressure to maintain the desired relation of water solution temperature to solvent boiling point, i.e. to reduce the water temperature to below the agglomeration temperature of the chlorinated polyethylene material, while still maintaining the water temperature sufficiently above the boiling point of the solvent.

The water temperature must be sufficiently below the fusion temperature of the particles to prevent their agglomeration. With 68–72% chlorine content polyethylenes, which fuse in the 215–220° C. range, operation at 100° C. is suitable since their agglomeration temperatures are above 100° C. and at this temperature the material is hard and not sticky. The 55–60% chlorine content polyethylene resins, which fuse in the 135–145° C. range, agglomerate in the 80°–90° C. range, and water temperatures above this range may result in agglomeration of the particles into large lumps. A preferred maximum water temperature for this material is about 60° C. with carbon tetrachloride as the solvent, requiring reduced pressure for flash distillation of the carbon tetrachloride from the chlorinated polyethylene solution.

Water temperatures lower than 100° C. at atmospheric pressure may be used as long as they are sufficiently above the boiling point of the solvent to produce a hard particle which does not agglomerate. Retention of too much solvent, caused by undesirably low water temperatures, produces soft particles which tend to agglomerate. The 68–72% chlorine content polyethylene resins, containing the maximum amount of chlorine and having the highest fusion point, are sufficiently hard and brittle to be successfully processed from carbon tetrachloride solution at a minimum water temperature of about 80° C. at atmospheric pressure. With carbon tetrachloride, boiling at 76° C. at atmospheric pressure, this represents a minimum temperature differential of 4° C. between the water temperature and the boiling point of the carbon tetrachloride.

Chlorinated polyethylene materials of low fusion and agglomeration points require low water temperatures, and hence must be processed under vacuum to lower the solvent boiling point below the water temperature. Carbon tetrachloride solutions of the 55–60% chlorinated polyethylene waxes are preferably processed at a maximum pressure of 232 mm. of mercury absolute when using the preferred maximum water temperature of about 60° C. Carbon tetrachloride boils at 42° C. at 232 mm., giving a temperature differential of 18° C. between the water temperature and the solvent boiling point.

Higher pressures giving lower temperature differentials can be used, but the operation requires more care to prevent agglomeration. A pressure of 317 mm. (carbon tetrachloride boils at 50° C. giving a temperature differential of 10° C.) may be used successfully but with difficulty when working with the 55–60% chlorine content polyethylenes at a water temperature of 60° C. A pressure of 390 mm. may be used under these conditions (carbon tetrachloride boils at 56° C. giving a temperature differential of 4° C.) if extreme care is employed.

Lower pressures may also be used, the minimum pressure being the point at which the water boils (water boils at 149 mm. at 60° C.). Such lower pressures are undesirable, however, since the boiling point of the solvent is lowered unnecessarily making the vapors more difficult to condense and recover.

For products near the lower fusion temperature limit of 90° C., which agglomerate at about 40° C., a water temperature of about 20° C. may be used, and a pressure of about 56 mm., at which $CCl_4$ boils at 10° C., thus providing a 10° differential between water temperature and boiling point of the solvent.

Atmospheric pressure operation is generally suitable for use with chlorinated polyethylenes having fusion temperatures above about 175° or higher (corresponding to about 65% or higher chlorine content), while vacuum or sub-atmospheric operation is preferred with products of lower fusion points corresponding to products containing from about 50% up to about 65% chlorine.

Removal of last traces of solvent (e.g. from 5% down) is preferably conducted at a temperature only slightly below the point at which the slurry particles agglomerate, since higher temperatures accelerate solvent removal. The maximum pressure is that at which the solvent boils, and the minimum pressure is that at which water boils.

In general, I prefer to maintain a temperature differential of at least about 4° C. between the water temperature and the boiling point of the solvent under the pressure conditions employed, preferably between about 10° C. and about 25° C., and to maintain the water temperature at least about 10° C. below the agglomeration point of the resin, i.e. at least about 50° C. below its fusion point.

The following specific examples further illustrate my invention. Parts are by weight except as otherwise noted.

*Example 1*

1-A. CHLORINATION OF POLYETHYLENE WAX

Into a glass lined, jacketed surge kettle equipped with an agitator and pump actuated outlet, was charged 28 gallons (376 pounds) of carbon tetrachloride and 20 pounds of a polyethylene/isopropanol telomer wax, having an average molecular weight of about 2,000, melting point of about 97° C. to about 102° C., needle penetration by ASTM D-5-25 of about 0.3 mm. to about 0.5 mm. at 77° F., 5 seconds with a 200 gram weight (equivalent to between about 0.1 mm. and about 0.17 mm. with the standard 100 gram weight). The polyethylene wax was dissolved in the $CCl_4$ by heating the contents to about 65° C. with agitation, thus forming a 5.05% solution. The solution was then circulated through the outlet and thence through a heat exchanger to a vertical glass reactor irradiated with fluorescent light. Gaseous chlorine was introduced into the reactor to flow co-currently with the polyethylene wax solution, a small stream being introduced initially, which was increased, after start of the reacting, to a maximum of 13–14 pounds per hour, and the temperature was slowly reduced to about 50° C. After passing through the reactor at a rate of about 6 gallons per minute, the reaction mass was passed into a horizontal chamber wherein evolved HCl was disengaged, and thence back to the surge kettle. Circulation was continued for 10 hours while maintaining the temperature between about 48° C. and about 57° C. After completion of the 10 hour chlorination period, during which 96 pounds of chlorine was added, resulting product amounted to 416 pounds of a 16.0% solution of chlorinated polyethylene wax in carbon tetrachloride. A portion of the chlorinated product was tested and found to have a chlorine content of 70.9%, a fusion temperature of 220° C., and an agglomeration temperature above 100° C.

1-B. SOLVENT REMOVAL

A 100 gallon jacketed kettle, equipped with agitator and vapor take-off tube was charged with 49 gallons of water in which 375 grams of ethylene oxide-nonyl phenol condensation product (Igepal CO–630) was dissolved. The solution was heated to 95°–98° C., and was agitated. During continued agitation, 400 pounds of the carbon tetrachloride solution of chlorinated polyethylene obtained in Example 1–A above, was fed in a small stream into the solution of surface active agent in the kettle, at a rate of about 4 to 5 gallons per hour.

As the solution entered the surfactant solution, it was finely dispersed and as the temperature of the aqueous medium was above the boiling point (76° C.) of the $CCl_4$, much of the $CCl_4$ immediately volatilized and escaped from the liquid medium together with some water vapor. The combined vapors were then passed into the take-off tube through which they were led to a shell and tube condenser wherein water and carbon tetrachloride were condensed and the carbon tetrachloride subsequently separated and recovered for reuse.

To control foaming, small amounts of a silicone antifoam agent were added from time to time as required to the kettle.

As the carbon tetrachloride flashed from the stream of chlorinated polyethylene solution, the dispersed particles, from which the bulk of the $CCl_4$ had been removed, solidified but continued as a dispersed phase in the aqueous medium. No coalescence of particles was observed, and no scumming of the sides of the kettle or agitator took place, nor "blanketing" of solid particles on the surface.

When all the $CCl_4$ solution of chlorinated polyethylene had been added to the aqueous surfactant solution, the solid chlorinated polyethylene product contained about 6% $CCl_4$. Then, an additional 150 grams of ethylene oxide-nonyl phenol condensation product (Igepal CO–630) in 15 gallons of water were added to the dispersion, and the contents of the kettle were heated to 100° C., and agitation continued. Water was then distilled off through the take-off tube and condenser, carrying with it additional quantities of the residual carbon tetrachloride, as it diffused out of the solid particles and escaped to the surface. Distillation was thus continued, at atmospheric pressure, for 48 hours at a rate of ½ gallon of condensate per hour. The chlorinated polyethylene resin product was then recovered by filtration, washed free of surfactant with water and analysed for carbon tetrachloride content, which was found to be 1.9%.

*Example 2*

2-A. CHLORINATION OF POLYETHYLENE WAX

A 27.75 pound charge of polyethylene wax of the same character as used in Example 1–A above was dissolved in about 28 gallons (370 pounds) of carbon tetrachloride, producing 398 pounds of a 7% solution of polyethylene/isopropanol telomer wax in carbon tetrachloride. The solution was subjected to chlorination in the same manner described under Example 1–A, except that chlorination was discontinued after 77 pounds of chlorine had been used, and the final product amounted to 410 pounds of a 16.1% solution of chlorinated polyethylene. A portion of the chlorinated polyethylene product was isolated and tested and found to have a chlorine content of 57 to 58%, a fusion temperature of 134° C., and an agglomeration temperature of about 85° C.

2-B. SOLVENT REMOVAL

A 100 gallon jacketed kettle, equipped with agitator and vapor take-off tube and condenser was charged with 49 gallons of water containing 375 grams of an ethylene oxide-nonyl phenol condensation product (Igepal CO–630) dissolved therein. The solution was heated to 55° to 58° C. and maintained at 192–195 mm. Hg pressure absolute and was agitated. During continued vigorous agitation, the carbon tetrachloride solution of chlorinated polyethylene resin obtained in Example 2–A above, was fed into the solution of surface active agent at an average rate of 1.5 to 3 gallons per hour, over a period of 16 hours. During addition, a liquid-liquid emulsion of CCl₄ solution of chlorinated polyethylene in the aqueous surfactant solution formed, and carbon tetrachloride distilled from the charge and was removed through the vapor take-off tube and was condensed. As before, a silicone anti-foam agent was added as required. During mixing, the emulsion was transformed to a dispersion of solid, noncoalescent particles in the aqueous medium. After completion of addition, the chlorinated polyethylene product contained about 2% carbon tetrachloride.

After completion of the mixing, an additional 100 grams of "Igepal CO–630" in 15 gallons of water was added and the slurry was heated to 63–65° C. and maintained at 160–170 mm. pressure for an additional 24 hours during which water vapor and a major portion of the residual carbon tetrachloride distilled and were removed. The solid chlorinated polyethylene resin was then recovered by filtration. Analysis showed carbon tetrachloride content of 0.5%.

*Example 3*

3–A. CHLORINATION OF OXIDIZED POLYETHYLENE WAX

Into a glass lined, jacketed kettle, equipped with agitator and pump actuated outlet, was charged 25 gallons (332.5 pounds) of carbon tetrachloride and 36.75 pounds of a partially oxidized polyethylene/isopropanol telomer wax having an oxygen content of about 9%, an average molecular weight of about 800, melting point of about 93° C., penetration of about 1 to 1.5 mm. by ASTM test method D–5–25, acid number and saponification number of about 50. The oxidized polyethylene wax was dissolved in the carbon tetrachloride by agitation and heating, forming an 11% solution by weight in CCl₄. Chlorination was carried out as described in Example 1, by circulating the solution, together with chlorine, through an irradiated reaction tube. The chlorination reaction was started at 65° C. and was maintained at 59–61° C. during the chlorination process. A total of 117 pounds of chlorine was used, and chlorination was discontinued after 15 hours. Circulation of the charge was continued for an additional 5 hours during which nitrogen was introduced to sweep out unreacted chlorine. The resulting product amounted to 365 pounds of a solution containing 23% by weight of chlorinated oxidized polyethylene/isopropanol telomer resin. A portion of the product was isolated and tested and found to have a chlorine content of 57.8%, oxygen content of 4%, a fusion temperature of 146° C., and an agglomeration temperature of about 90° C.

B. SOLVENT REMOVAL

As in the previous examples, a 100 gallon jacketed kettle, equipped with agitator, vapor take-off tube and condenser, was charged with 49 gallons of water in which 385 grams of a polyoxyethylated vegetable oil product (Emulphor EL–620) were dissolved. With vigorous agitation (268 r.p.m.) 17 gallons of the CCl₄ solution of chlorinated, oxidized polyethylene resin product obtained in Example 3–A, above, was added to the aqueous surfactant solution at a rate of about 2 to 3 gallons per hour, while maintaining the slurry at a temperature of 49° to 52° C. and at 145 to 160 mm. pressure, over a period of 7 hours. As before, a silicone anti-foam agent was added from time to time to control foaming.

After completion of addition of the chlorinated, oxidized polyethylenee resin solution to the surfactant solution, an additional 250 grams of "Emulphor" EL–620 and 150 grams of the ammonium salt of a sulfated condensate of an alkyl phenol and ethylene oxide (Alipal CO–436) were added, agitation was decreased somewhat (to 115 r.p.m.), pressure was reduced to 90–95 mm., while continuing to maintain the temperature at 50° C. to 52° C., and these conditions were maintained for an additional 24 hours to remove residual solvent.

The product was then isolated by filtration, washed free of emulsifying and anti-foam agents, dried and analyzed. The product contained 2.1% of carbon tetrachloride.

*Example 4*

To 1500 parts of a 0.1% aqueous solution of ethylene oxide-nonyl phenol condensation product (Igepal CO–730) maintained at 95°–100° C. was added gradually, in a thin stream 2900 parts of a chlorinated polyethylene solution in carbon tetrachloride, containing 350 parts of a chlorinated polyethylene containing 69.1% chlorine (about 12% solution) and prepared as described in Example 1–A, having a fusion point of 216° C. and an agglomeration temperature above 100° C., over a period of six hours while thoroughly agitating the slurry. A silicone anti-foam agent was added as required for foam control.

After completion of mixing, the slurry suspension was maintained at 95–100° C. for 96 hours at atmospheric pressure while bubbling air through the flask at a rate of about 0.25 liter per minute per liter of slurry, the air ebullition providing most of the agitation.

Samples of product were taken at the start of the aeration and at intervals during its progress and analyzed for CCl₄ content with the results shown in Table II below:

TABLE II

*Effect of aeration time at 95–100° C. on CCl₄ content of a chlorinated polyethylene of 69.1% chlorine*

| Aeration time, hours: | CCl₄ content, percent by weight |
|---|---|
| 0 | 5.7 |
| 29 | 2.2 |
| 54 | 1.7 |
| 96 | 1.3 |

After carbon tetrachloride removal had been effected the slurry was filtered without difficulty on a Büchner funnel, was washed free of surface active agent with water and pressed "dry." The resulting cake was held at 65° C. for three days, the cake soon crumbling to a powder which was turned occasionally during the drying period.

The final product had a water content of 0.0%, a fusion temperature of 216° C. and a thermal stability at 175° C. (percent HCl evolved) of 0.16. The viscosity of its 12% solution in carbon tetrachloride was 8.60 centistokes at 25° C.

*Example 5*

Into 2,000 parts of a 0.15% aqueous solution of ethylene oxide-nonyl phenol condensation product (Igepal CO–730) maintained at 58°–60° C. and 216 mm. Hg pressure absolute, was introduced, with agitation, 2,100 parts of a carbon tetrachloride solution of chlorinated polyethylene of 57.1% chlorine content and an agglomeration temperature of about 90° C. prepared as described in Example 2–A above, containing 250 parts of chlorinated polyethylene (about a 12% solution) over a period of six hours, withdrawing the CCl₄ as it flashed from the slurry. A silicone anti-foam agent was added as required for foam control. After addition was complete, the pressure was reduced to 149 mm. while maintaining the temperature at 58°–60° C., and continuing agitation, and water was slowly distilled over a period of 45 minutes to reduce further the carbon tetrachloride content.

The slurry was then subjected to aeration as described in Example 4, while maintaining the temperature at 67°–70° C., samples of product being taken just prior to the start of the aeration, and at intervals of 24 hours and 50 hours after the start and tested for CCl₄ content with the results shown in Table III below.

TABLE III

*Effect of aeration time at 67–70° C. on CCl₄ content of a chlorinated polyethylene of 57.1% chlorine*

| Aeration time, hours: | CCl₄ content, percent by weight |
|---|---|
| 0 | 1.5 |
| 24 | 0.6 |
| 50 | 0.3 |

After carbon tetrachloride removal had been effected, the slurry was filtered, washed and dried as described in Example 4.

The final product had a water content of 0.0%, a fusion point of 142° C., a softening point of 159° C., specific gravity (25°/25°) of 1.43, thermal stability at 175° C. (percent HCl evolved) of 0.81. The viscosity of the 12% CCl₄ solution was 8.24 centistokes at 25° C.

Example 6

Into 2,000 parts of a 0.15% aqueous solution of a phenoxy polyoxyethylene sulfate surfactant (Alipal CO-436) maintained at 50° C. and a pressure of about 145–150 mm. Hg absolute, was introduced, with agitation, 1,000 parts of a 23% carbon tetrachloride solution of chlorinated, oxidized polyethylene resin containing about 60% chlorine, about 3.5% oxygen, and having an agglomeration temperature of 90° C. prepared as described in Example 3–A above, over a period of six hours. During the mixing of the solutions, the carbon tetrachloride which volatilized was removed from the solution and condensed for further use. A silicone anti-foam agent was added from time to time for foam control. A sample of the product was then anlyzed and found to have a carbon tetrachloride content of 5.1%.

After addition was complete, the pressure was reduced to 150 mm. and while maintaining the temperature at 63°–65° C., the slurry was then subjected to aeration as described in Example 4 and samples taken at intervals and analyzed for carbon tetrachloride content with the results shown in Table IV below.

TABLE IV

*Effect of aeration time at 63–65° C. on CCl₄ content of chlorinated, oxidized polyethylene of 60% chlorine content*

| Aeration time, hours: | CCl₄ content, percent by weight |
|---|---|
| 1 | 5.1 |
| 15 | 1.3 |
| 36 | 0.4 |

After carbon tetrachloride removal had been effected, the slurry was filtered, washed and dried at 50° C.

The final product had a fusion point of 149° C.

Fusion temperatures as referred to herein are the values determined according to Parr Instrument Co. Specification No. 3821 which involves heating a sample on an exposed metal surface until melting occurs, and observing the surface temperature at the point of melting.

Softening points are as measured by the shouldered ring and ball method described in ASTM Standards 1952, part 3, page 1554.

Chlorine contents are determined by the Parr bomb method which involves reaction of the chlorinated polyethylene with sodium peroxide converting chlorine to NaCl and determining chloride ion by the usual volumetric method.

Agglomeration temperatures are determined by forming a 10% suspension of the chlorinated polyethylene in a 0.1% aqueous surface active agent solution, agitating the suspension while heating, and observing the temperature at which the suspension coagulates or agglomerates.

Solvent contents were determined by infrared absorption, using a standard sample prepared from a benzene solution of chlorinated polyethylene for comparison.

While the above describes the preferred embodiments of the invention, it will be understood that departures may be made therefrom within the scope of the specification and claims.

I claim:

1. The process for removing solvent from chlorinated polyethylene resins containing between about 50% and about 72% chlorine, having average molecular weights between about 1,500 and about 10,000, and fusion temperatures between about 90° C. and about 220° C., which comprises gradually introducing a solution of such resin in a water-immiscible solvent having a boiling point below 100° C. under standard atmospheric conditions, into a dilute, aqueous solution of a water soluble surface active agent maintained under agitation at a temperature at least about 10° C. below the agglomeration temperature of the resin, and at least about 4° C. above the boiling point of the solvent, whereby solvent flash-distills, removing the volatilized solvent, and thereafter mechanically separating the resultant finely divided particulate solid resinous product from the aqueous medium.

2. The process according to claim 1 wherein the solvent is carbon tetrachloride.

3. The process for removing solvent from chlorinated polyethylene resins containing between about 50% and about 72% chlorine, having average molecular weights between about 1,500 and about 10,000, and fusion temperatures between about 90° C. and about 220° C., which comprises gradually introducing a solution of such resin in a water-immiscible solvent having a boiling point below 100° C. under standard atmospheric conditions, into a dilute aqueous solution of a water soluble surface active agent maintained under agitation at a temperature at least about 10° C. below the agglomeration temperature of the resin, and at least about 4° C. above the boiling point of the solvent, whereby solvent flash-distills, removing the volatilized solvent, continuing the agitation after completion of introduction of the resin solution into the aqueous surfactant solution, while maintaining the temperature of the mixture at a temperature between 100° C. and not more than about 20° C. below the boiling point of the solvent until the resulting solid resinous product has a solvent content below about 2%, and thereafter mechanically separating the resultant finely divided particulate solid resinous product from the aqueous medium.

4. The process according to claim 3, wherein the solvent is carbon tetrachloride.

5. The process according to claim 3, wherein the agitation is provided by gas ebullition.

6. The process for removing carbon tetrachloride from chlorinated polyethylene resins containing between about 65% and about 72% chlorine, having average molecular weights between about 1,500 and about 10,000, and fusion temperatures between about 175° C. and about 220° C., which comprises gradually introducing a carbon tetrachloride solution of such resin into a dilute aqueous solution of a water soluble surface active agent maintained under agitation at a temperature at least about 10° C. below the agglomeration temperature of the resin and at least 4° C. above the boiling point of the carbon tetrachloride, whereby carbon tetrachloride flash-distills, removing the volatilized carbon tetrachloride and thereafter mechanically separating the resultant finely divided particulate solid resinous product from the aqueous medium.

7. The process according to claim 6, wherein the chlorinated polyethylene resin is a chlorinated, oxidized polyethylene alkanol telomer containing between about 1.0% and about 4.0% oxygen.

8. The process for removing carbon tetrachloride from chlorinated polyethylene resins containing from about 50% up to about 65% chlorine, having average molecular weights between about 2,000 and about 10,000, and fusion temperatures between about 90° C. and about 175° C., which comprises gradually introducing a carbon tetrachloride solution of such resin into a dilute aqueous solution of an acid-stable water soluble surface active agent maintained under agitation at sub-atmospheric pressure, at a temperature at least about 10° C. below the agglomeration temperature of the resin, and at least about 4° C. above the boiling point of the carbon tetrachloride, whereby the carbon tetrachloride flash-distills, removing the volatilized carbon tetrachloride and thereafter mechanically separating the resultant finely divided particulate solid resinous product from the aqueous medium.

9. The process according to claim 8, wherein the chlorinated polyethylene resin is a chlorinated, oxidized polyethylene alkanol telomer containing between about 1.5% and about 5.0% oxygen.

10. The process for removing solvent from chlorinated polyethylenes containing between about 50% and about 72% chlorine having average molecular weights between about 1,500 and about 10,000 and fusion temperatures between about 90° C. and about 200° C. which comprises gradually introducing a solution of such chlorinated polyethylene in a water-immiscible halogenated hydrocarbon solvent having a boiling point below 100° C. under standard atmospheric conditions, into an aqueous solution containing between about 0.01% and about 0.5% by weight of a water-soluble surface active agent selected from the group consisting of ethylene oxide alkyl phenol condensation products, polyoxyethylated sorbitan monooleates, polyoxyethylated vegetable oils, polyoxyethylene monolaurate, ammonium alkyl phenoxypolyoxyethylene ethyl sulfates, long chain alkyl aryl sulfonates, sodium higher alkyl sulfates, sodium naphthalene sulfonates, dimethylbenzyl higher alkyl ammonium chloride, higher alkyl dimethyl amine oxides, higher alkyl trimethyl ammonium chloride, higher alkyl polyoxyethylene amines and mixtures thereof, under agitation at a temperature at least about 10° C. below the agglomeration temperature of the chlorinated polyethylene and at least about 4° C. above the boiling point of the solvent, whereby solvent flash-distills, removing the volatilized solvent and thereafter separating the resultant finely divided particulate solid chlorinated polyethylene from the aqueous medium.

References Cited in the file of this patent

UNITED STATES PATENTS

| | | |
|---|---|---|
| 2,481,188 | Babayan | Sept. 6, 1949 |
| 2,728,753 | Russum et al. | Dec. 27, 1955 |
| 2,779,754 | Erchak, Jr. | Jan. 29, 1957 |
| 2,913,449 | Hoerger et al. | Nov. 17, 1959 |
| 2,920,064 | Baptist et al. | Jan. 5, 1960 |

FOREIGN PATENTS

| | | |
|---|---|---|
| 627,376 | Great Britain | Aug. 8, 1949 |

UNITED STATES PATENT OFFICE
CERTIFICATE OF CORRECTION

Patent No. 3,005,812            October 24, 1961

Herbert C. Wohlers

It is hereby certified that error appears in the above numbered patent requiring correction and that the said Letters Patent should read as corrected below.

Column 1, line 47, for "lower" read -- low --; column 4, line 17, before "about", first occurrence, insert -- between --; line 27, for "30%" read -- 50% --; column 7, lines 56 and 57, for "reacting" read -- reaction --; column 9, line 67, for "polyethylenee" read -- polyethylene --; column 11, line 34, for "anlyzed" read -- analyzed --; column 12, line 62, after "least" insert -- about --.

Signed and sealed this 17th day of April 1962.

(SEAL)
Attest:

ESTON G. JOHNSON            DAVID L. LADD

Attesting Officer            Commissioner of Patents